(12) United States Patent
Morilhat et al.

(10) Patent No.: US 9,056,571 B2
(45) Date of Patent: Jun. 16, 2015

(54) HEADREST AND METHOD FOR MANUFACTURING A HEADREST

(75) Inventors: Philippe Morilhat, Strasburg (FR); Sophie Reiner, Strasburg (FR); Ana Paula Martini, Gries (FR)

(73) Assignee: Johnson Controls Technology Company, Holland, MI (US)

( * ) Notice: Subject to any disclaimer, the term of this patent is extended or adjusted under 35 U.S.C. 154(b) by 105 days.

(21) Appl. No.: 13/701,607

(22) PCT Filed: May 23, 2011

(86) PCT No.: PCT/EP2011/002554
§ 371 (c)(1),
(2), (4) Date: Mar. 18, 2013

(87) PCT Pub. No.: WO2011/154095
PCT Pub. Date: Dec. 15, 2011

(65) Prior Publication Data
US 2013/0175843 A1 Jul. 11, 2013

(30) Foreign Application Priority Data

Jun. 9, 2010 (DE) .......... 10 2010 023 246

(51) Int. Cl.
*A47C 1/10* (2006.01)
*B60N 2/70* (2006.01)
(Continued)

(52) U.S. Cl.
CPC ............ *B60N 2/7017* (2013.01); *Y10T 29/481* (2015.01); *B29C 44/1257* (2013.01); *B29C 44/351* (2013.01); *B29L 2031/3023* (2013.01); *B60N 2/48* (2013.01); *B60N 2/5825* (2013.01)

(58) Field of Classification Search
CPC .......... A47C 7/38; A47C 7/386; A47C 31/10; A47C 31/11; B60N 2/60
USPC ............... 297/391, 220, 219.1, 408
See application file for complete search history.

(56) References Cited

U.S. PATENT DOCUMENTS 4,003,599 A   1/1977  Takamatsu
4,858,994 A * 8/1989  Yamashita .................... 297/391
(Continued)

FOREIGN PATENT DOCUMENTS

CN       1215674      5/1999
FR       2911308 A1   7/2008
(Continued)

OTHER PUBLICATIONS

International Search Report for application No. PCT/EP2011/002554 mailed Oct. 5, 2011.
(Continued)

*Primary Examiner* — Jose V Chen
(74) *Attorney, Agent, or Firm* — Fletcher Yoder, P.C.

(57) ABSTRACT

A headrest and a method for manufacturing a headrest are proposed, wherein the headrest is provided, in particular, as a motor vehicle headrest, wherein the headrest has a cover and a foamed material, wherein the foamed material fills the cover at least in certain areas, wherein the headrest is manufactured in such a way that the foamed material is at least partially liquid at the time when the foamed material is introduced into the cover, wherein the cover has at least one closure element, wherein an opening in the cover which is present before the foamed material is introduced can be closed off by means of the closure element.

6 Claims, 3 Drawing Sheets

(51) Int. Cl.
  *B29C 44/12* (2006.01)
  *B29C 44/34* (2006.01)
  *B60N 2/48* (2006.01)
  *B60N 2/58* (2006.01)
  *B29L 31/30* (2006.01)

(56) References Cited

U.S. PATENT DOCUMENTS

| | | | |
|---|---|---|---|
| 5,261,726 A * | 11/1993 | Yanagishita | 297/408 |
| 5,452,939 A * | 9/1995 | Kupisz et al. | 297/391 |
| 5,478,136 A * | 12/1995 | Takeuchi et al. | 297/391 |
| 5,611,977 A | 3/1997 | Takei | |
| 5,681,087 A * | 10/1997 | Yamano et al. | 297/391 |
| 5,681,088 A * | 10/1997 | Takei | 297/408 |
| 5,855,831 A * | 1/1999 | Takei | 264/46.6 |
| 5,927,814 A * | 7/1999 | Yoshimura | 297/391 |
| 5,967,612 A | 10/1999 | Takei | |
| 6,068,338 A * | 5/2000 | Takei et al. | 297/391 |
| 6,200,506 B1 * | 3/2001 | Takei | 264/46.6 |
| 7,338,129 B2 * | 3/2008 | Tabata | 297/391 |
| 2006/0071528 A1 * | 4/2006 | Foelster et al. | 297/391 |
| 2007/0132299 A1 * | 6/2007 | Fernandez De La Pradilla et al. | 297/408 |

FOREIGN PATENT DOCUMENTS

| | | |
|---|---|---|
| JP | S62-111411 U | 7/1987 |
| JP | H03112968 | 11/1991 |
| JP | H0539400 | 5/1993 |
| JP | H06-79509 | 11/1994 |
| JP | H08-501968 A | 3/1996 |
| JP | 09011252 A | 1/1997 |
| JP | 09056939 A | 3/1997 |
| JP | 09267679 A | 10/1997 |
| JP | 3063830 U | 9/1999 |
| JP | 11-313727 | 11/1999 |
| JP | 2010-104507 | 5/2010 |

OTHER PUBLICATIONS

Japanese Office Action dated Feb. 17, 2014.
Chinese Examination Report dated Oct. 10, 2014.
Japanese Office Action dated Feb. 27, 2015.

* cited by examiner

HEADREST AND METHOD FOR MANUFACTURING A HEADREST

CROSS REFERENCE TO RELATED APPLICATIONS

This application claims priority from and the benefit of PCT Application No. PCT/EP2011/002554, filed on May 23, 2011; and German Patent DE 10 2010 023 246.7, filed on Jun. 9, 2010; both entitled "Headrest and Method for Manufacturing a Headrest", which are herein incorporated by reference.

BACKGROUND

The present invention relates to a headrest and to a method for manufacturing a headrest in particular a motor vehicle headrest, wherein the headrest has a cover and a foamed material, wherein the foamed material fills the cover at least in regions.

Headrests and methods for manufacturing headrests are known, wherein the foamed material is introduced into the cover of the headrest at least partially in a liquid state of the foamed material, what is referred to as the "pour-in-place" technique, that is to say, the foamed material is provided as foamed material which is poured in on site, or the cover is provided with the foam introduced therein.

In such headrests, before the foamed material is introduced, structural elements, for example headrest bars or the like, have to be introduced into the cover. In order to introduce the structural elements, an opening is absolutely necessary in the cover of the headrest, said opening having to be closed upon introduction of the foamed material. This requires certain conditions to be observed in respect of the configuration of the shape of the headrest and the arrangement of the opening.

SUMMARY

It is an object of the present invention to provide a headrest and a method for manufacturing a headrest, in particular a motor vehicle headrest, wherein the conditions in respect of the configuration of the shape of the headrest and of the arrangement of the opening are at least less restricted, if at all, than in the case of known headrests and the manufacturing methods thereof, and wherein the aesthetic demands imposed on such headrests—in particular in the region of the opening—are not worse than for known solutions.

The object is achieved by a headrest, in particular motor vehicle headrest, wherein the headrest has a cover and a foamed material wherein the foamed material fills the cover at least in regions, and wherein the headrest is manufactured in such a manner that the foamed material is at least partially liquid when the foamed material is introduced into the cover, wherein the cover has at least one closure element, wherein an opening which is present in the cover before the foamed material is introduced is closable by means of the closure element.

The object is furthermore achieved by a headrest, in particular motor vehicle headrest, wherein the headrest has a cover and a foamed material, wherein the foamed material fills the cover at least in regions, and wherein the headrest is manufactured in such a manner that the foamed material is at least partially liquid when the foamed material is introduced into the cover, wherein the cover has a zip fastener as the closure element.

It is thereby advantageously possible according to the invention for a great degree of freedom of design in respect of the shape of the headrest and in respect of the positioning of the opening in the cover of the headrest to be provided.

It is particularly preferred according to the invention if the closure element is a zip fastener. By this means, it is advantageously possible according to the invention to realize a particularly stable connection of the cover in the region of the opening, said opening, furthermore, also having particularly good tightness in relation to the liquid foamed material. This provides a particularly simple and effective possibility of obtaining a greater degree of freedom for the arrangement of the closure element than in conventional designs of the headrest without causing a deterioration in the aesthetic effect of the headrest.

It is furthermore preferably provided according to the invention that the cover has an inner non-visible side and an outer visible side, wherein the closure element is visible exclusively from the inner non-visible side. This ultimately means that the closure element is not visible from the visible side, thus resulting in an aesthetically particularly attractive external shape of the headrest.

According to the invention, it is furthermore preferred for the closure element to be provided in a manner sealed against the liquid foamed material escaping. It is thereby possible in a comparatively simple manner for the liquid foamed material to be effectively prevented from escaping during the manufacturing process of the headrest irrespective of the arrangement of the opening and therefore of the arrangement of the closure element on the headrest.

Furthermore, it is preferred according to the present invention for the cover to have a covering element in such a manner that, in the closed state of the closure element, the closure element is covered by the covering element.

By this means, it is advantageously possible according to the present invention with simple means to attain particularly good sealing of the cover in the region of the closure element.

According to the invention, it is furthermore preferred for the cover to have a further opening which is present before introducing the foamed material, wherein the foamed material is introducible into the cover through the further opening.

The present invention furthermore relates to a method for manufacturing a headrest, in particular a motor vehicle headrest, wherein the headrest has a cover and a foamed material, wherein the foamed material fills the cover at least in regions, and wherein the cover has a closure element, wherein the method has the following steps:

manufacturing the cover and providing an opening in the region of the closure element, introducing structural elements into the interior of the cover through the opening, closing the opening by the closure element, introducing the foamed material into the interior of the cover, wherein the foamed material is at least partially liquid when being introduced.

According to the invention, it is furthermore preferred for the cover to have a further opening which is present before the foamed material is introduced, wherein the foamed material is brought into the cover through the further opening.

DRAWINGS

Exemplary embodiments of the invention are illustrated in the drawing and explained in more detail in the description below of the figures.

DETAILED DESCRIPTION

Figure 1:
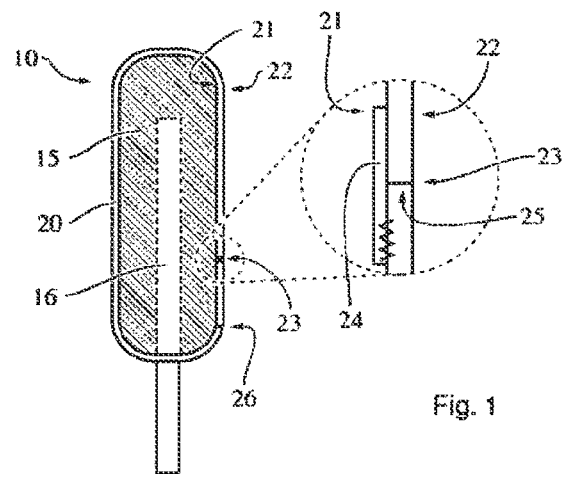
FIG. 1 shows a schematic sectional view of a headrest with an enlargement of a detail in the right part of FIG. 1, wherein the enlargement of the detail comprises the region of a closure element.

FIG. 1 schematically depicts a headrest 10 according to the invention in a sectional illustration. The headrest 10 has a cover 20 and a structural element 16 or a plurality of structural elements 16. The cover 20 has an inside 21 and an outside 22, wherein the inside 21 or inner side is the non-visible side 21, and wherein the outside 22 or outer side is the visible side 22, i.e. that side of the cover 20 which is seen by a user of the headrest 10 during normal use. A foamed material 15 which at least partially fills the cover 20 is arranged in the interior of the cover 20.

According to the invention, the headrest 10 is manufactured by means of what is referred to as the pour-in-place technique. This means that the foamed material 15 is introduced into the cover 20 of the headrest 10 at least partially in a liquid state of the foamed material 15, i.e. the foamed material 15 is provided as a foamed material which is poured in on site or the cover 20 is provided with foam introduced therein.

In order to introduce the structural element 16 or the plurality of structural elements 16 into the cover 20 before the (liquid material of the) foamed material 15 is introduced, an opening 23 is provided in the cover 20. The opening 23 has to be or is opened before the structural element 16 is introduced and has to be closed for the introduction of the foamed material 15 so that no (liquid) foamed material 15 can escape from the (opened or partially opened) opening 23 (which would impair the aesthetic result).

According to the invention, it is provided that the opening 23 is closed with a closure element 25 (after the structural element or the plurality of structural elements 16 is or are introduced into the interior of the cover 20 of the headrest 10). According to the invention, the closure element 25 may be a closure element 25 of any type, but a realization in the form of a zip fastener is preferred as the closure element 25. The use of a zip fastener as the closure element 25 has the advantage that particularly good tightness in relation to the (at least temporarily liquid) foamed material 15 located on the inside 21 of the cover 20 (after the foamed material 15 is introduced into the cover 20) is possible. According to the invention, it is advantageously possible for the tightness of the cover 20 in relation to such liquid foamed material 15 to be increased further by the arrangement of a covering element 24. The covering element 24 is provided, for example, in the interior 21 of the cover in such a region that the opening 23 and therefore also the closure element 25 is covered or is at least partially covered. For example, it is advantageously possible according to the invention for the covering element 24 (or a plurality of different covering elements 24) to be arranged in particular in the region of one or both ends of the closure element 25 extending, for example, in an elongate manner. In the right (enlarged) part of FIG. 1, the covering element 24 is connected (indicated by means of a zigzag line), for example in the lower region (i.e. on one side of the opening 23), to the cover 20 while the covering element 24 merely rests in the upper region (i.e. on the other side of the opening 23) on the cover 20.

Figure 2:
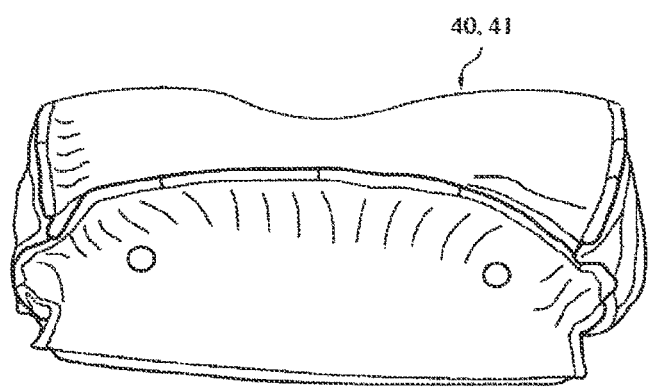
FIG. 2 shows an example of a cover of a headrest according to the prior art.

FIG. 2 illustrates an example of a cover 40 of a headrest according to the prior art. The inside 41 of the cover 40 is depicted here.

Figure 3:
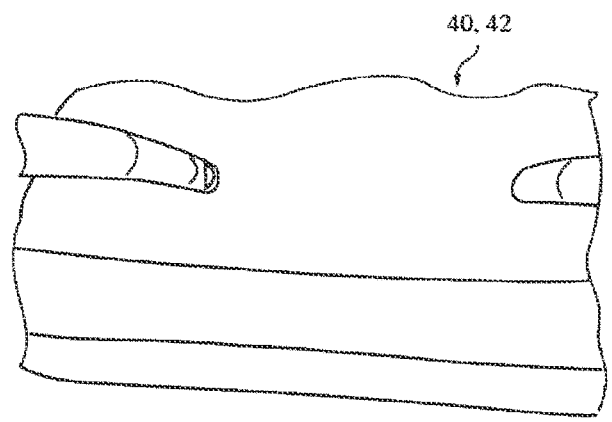
FIG. 3 shows an example of a headrest according to the prior art, wherein no closure element is arranged in the region of an opening in the cover of the headrest.

FIG. 3 depicts an example (of a partial view) of a headrest according to the prior art; wherein no closure element is arranged in the region of an opening in the cover 40 of the headrest. In this case, the outside 42 of the cover 40 is depicted.

Figure 4:
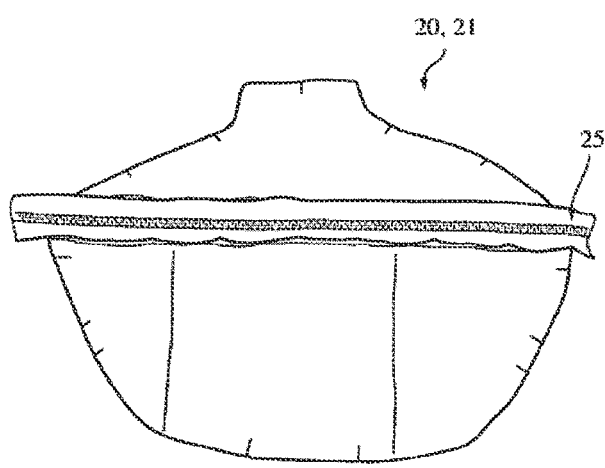
FIG. 4 shows the inside (non-visible side) of a cover for a headrest according to the invention, wherein the cover has a closure element in the form of a zip fastener in the region of an opening.

FIG. 4 illustrates the inside (non-visible side) 21 of the cover 20 for the headrest 10 according to the invention, wherein the cover 20 has a closure element 25 in the form of a zip fastener in the region of an opening 23.

Figure 5:
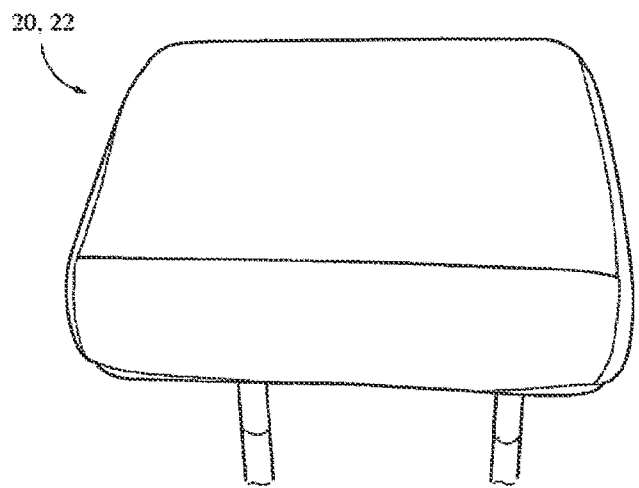
FIG. 5 shows the finished headrest with a cover according to FIG. 4, wherein a closure element in the form of a zip fastener is arranged in the region of the opening in the cover.

FIG. 5 illustrates the finished headrest 10 with a cover 20 according to FIG. 4, wherein the closure element 25 in the form of a zip fastener is arranged in the region of the opening 23 in the cover 20.

The invention claimed is:

1. A motor vehicle headrest, comprising a cover and a foamed material that fills the cover at least in regions, wherein the headrest is manufactured in such a manner that the foamed material is at least partially liquid when the foamed material is introduced into the cover, the cover comprises at least one closure element, and an opening which is present in the cover before the foamed material is introduced is closable by the at least one closure element;

wherein the at least one closure element comprises a zip fastener, the cover comprises a one-piece covering element configured to extend across the at least one closure element from a first side of the opening to a second side of the opening at least while the at least one closure element is in a closed state, and the covering element is coupled to an inner non-visible side of the cover.

2. The headrest as claimed in claim 1, wherein the cover has the inner non-visible side and an outer visible side, and the at least one closure element is visible exclusively from the inner non-visible side.

3. The headrest as claimed in claim 1, wherein the at least one closure element, when closed, is sealed to block the liquid foamed material from escaping.

4. The headrest as claimed in claim 1, wherein the cover comprises a further opening which is present before the foamed material is introduced, and the foamed material is introducible into the cover through the further opening.

5. A method for manufacturing a motor vehicle headrest, wherein the headrest comprises a cover and a foamed material, the foamed material fills the cover at least in regions, and the cover comprises a closure element, wherein the method comprises:

manufacturing the cover and providing an opening in a region of the closure element ;

introducing a structural element into the interior of the cover through the opening;

closing the opening by the closure element; and introducing the foamed material into the interior of the cover, wherein the foamed material is at least partially liquid when being introduced;

wherein the closure element comprises a zip fastener, the cover comprises a one-piece covering element configured to extend across the closure element from a first side of the opening to a second side of the opening at least while the closure element is in a closed state, and the covering element is coupled to an inner non-visible side of the cover.

6. The method as claimed in claim 5, wherein the cover comprises a further opening which is present before the foamed material is introduced, and the foamed material is brought into the cover through the further opening.

* * * * *